United States Patent
Liao et al.

(10) Patent No.: US 12,444,333 B1
(45) Date of Patent: Oct. 14, 2025

(54) UTILIZING NOISE THRESHOLD CONDITIONS FOR CONTROLLING SCANNING MIRRORS

(71) Applicant: Microsoft Technology Licensing, LLC, Redmond, WA (US)

(72) Inventors: Wenjun Liao, Sunnyvale, CA (US); Ruipeng Sun, Pleasanton, CA (US); Chuan Pu, Foster City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/631,826

(22) Filed: Apr. 10, 2024

(51) Int. Cl.
  *G09G 3/02* (2006.01)
  *G09G 3/00* (2006.01)

(52) U.S. Cl.
  CPC ............... *G09G 3/02* (2013.01); *G09G 3/001* (2013.01)

(58) Field of Classification Search
  CPC .......... G09G 3/02; G09G 3/001; G02B 26/10; G02B 26/105
  USPC ............................................................ 345/8
  See application file for complete search history.

(56) References Cited

U.S. PATENT DOCUMENTS

| 11,514,830 | B1 | 11/2022 | Liao | |
| 2018/0120365 | A1* | 5/2018 | Bhardwaj | G01R 31/42 |
| 2023/0069514 | A1 | 3/2023 | Liao | |
| 2023/0350038 | A1* | 11/2023 | Abe | G01S 7/497 |

FOREIGN PATENT DOCUMENTS

JP            2004144926 A    *  5/2004

* cited by examiner

*Primary Examiner* — Mark Edwards
(74) *Attorney, Agent, or Firm* — Alleman Hall & Tuttle LLP (57) ABSTRACT

One example provides a method enacted on a scanning display device comprising an illumination source, and a scanning mirror system including a sense circuit coupled to a scanning mirror. The method comprises operating the scanning mirror system using a drive signal while operating the illumination source to thereby project an image, obtaining a control parameter based at least upon an output of the sense circuit, and comparing the control parameter to a noise threshold condition. The method further comprises, when the control parameter does not meet the noise threshold condition, continuing operating the scanning mirror according to the drive signal. The method also comprises, when the control parameter meets the noise threshold condition, adjusting the drive signal to form an adjusted drive signal to change a trajectory of the scanning mirror.

20 Claims, 9 Drawing Sheets

UTILIZING NOISE THRESHOLD CONDITIONS FOR CONTROLLING SCANNING MIRRORS

BACKGROUND

Scanning display devices raster scan laser light using one or more scanning mirrors to project an image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a method enacted on a scanning display device comprising an illumination source, and a scanning mirror system including a sense circuit coupled to a scanning mirror. The method comprises operating the scanning mirror system using a drive signal while operating the illumination source to thereby project an image, obtaining a control parameter based at least upon an output of the sense circuit, and comparing the control parameter to a noise threshold condition. The method further comprises, when the control parameter does not meet the noise threshold condition, continuing operating the scanning mirror according to the drive signal. The method also comprises, when the control parameter meets the noise threshold condition, adjusting the drive signal to form an adjusted drive signal to change a trajectory of the scanning mirror.

DETAILED DESCRIPTION

As previously mentioned, a scanning display device reflects laser light using one or more scanning mirrors to raster scan pixels of an image to project the image. Some scanning display devices include two scanning mirrors separately driven in horizontal and vertical directions. Various types of scanning mirrors may be used, including but not limited to MEMS (microelectromechanical systems) mirror systems. Different scan rates are employed in the horizontal and vertical directions. For example, a horizontal scanning mirror can be driven (e.g. using harmonic oscillation at a resonant frequency) at a relatively faster rate. This mirror also can be referred to as a fast scan mirror. In contrast, a vertical scanning mirror may be driven at a relatively slower rate. This mirror also can be referred to as a slow scan mirror.

Noise in a control loop of the slow scan mirror may result in undesired movement in a trajectory of the slow scan mirror. Such undesired movement, or jitter, can be used as an image quality metric for a scanning projector. Unsuitably high jitter in the trajectory of the scanning mirror can cause visible artifacts in a displayed image, such as a pixel not in a same location from image frame to image frame. Current solutions for controlling slow scan mirrors utilize a feedback signal as a control parameter to understand real time status of the scanning mirror and adjust mirror movement accordingly. Therefore, it is beneficial to have a low-noise feedback signal that reflects the real mirror movement. However, the feedback signal may not reflect the real mirror movements due to noise impacting the feedback signal. Distortions in the feedback signal used as a control parameter, or used to derive a control parameter, can result in distortions in the trajectory, and therefore give rise to unsuitable levels of jitter.

Accordingly, examples are disclosed that relate to utilizing a noise threshold condition for a control parameter when operating a scanning mirror. Briefly, in one example, a scanning display device comprises an illumination source and a scanning mirror system including a drive circuit and a sense circuit operatively coupled to a scanning mirror. The scanning display device operates the scanning mirror system using a drive signal while operating the illumination source to thereby project an image. The scanning display device further obtains a control parameter based at least upon feedback from the sense circuit, and compares the control parameter to a noise threshold condition. The noise threshold condition provides a buffer zone within which noise in the control parameter can be ignored. The noise threshold condition can comprise one or more threshold values to which the control parameter is compared. The scanning display device continues operating the scanning mirror according to the drive signal when the control parameter does not meet the noise threshold condition. Further, the scanning display adjusts the drive signal to form an adjusted drive signal to change a trajectory of the scanning mirror when the control parameter meets the noise threshold condition. Here, the control parameter is outside the buffer zone and can be classified as real movement of the scanning mirror. In some examples, the noise threshold condition can be determined from a response of the sense circuit when injecting noise while a feedback loop is open. Such a scanning display device can enable a real change in trajectory of the scanning mirror to adjust the operation of the scanning mirror, while also avoiding unnecessary adjustments arising from the noise in the control parameter.

Figure 1:
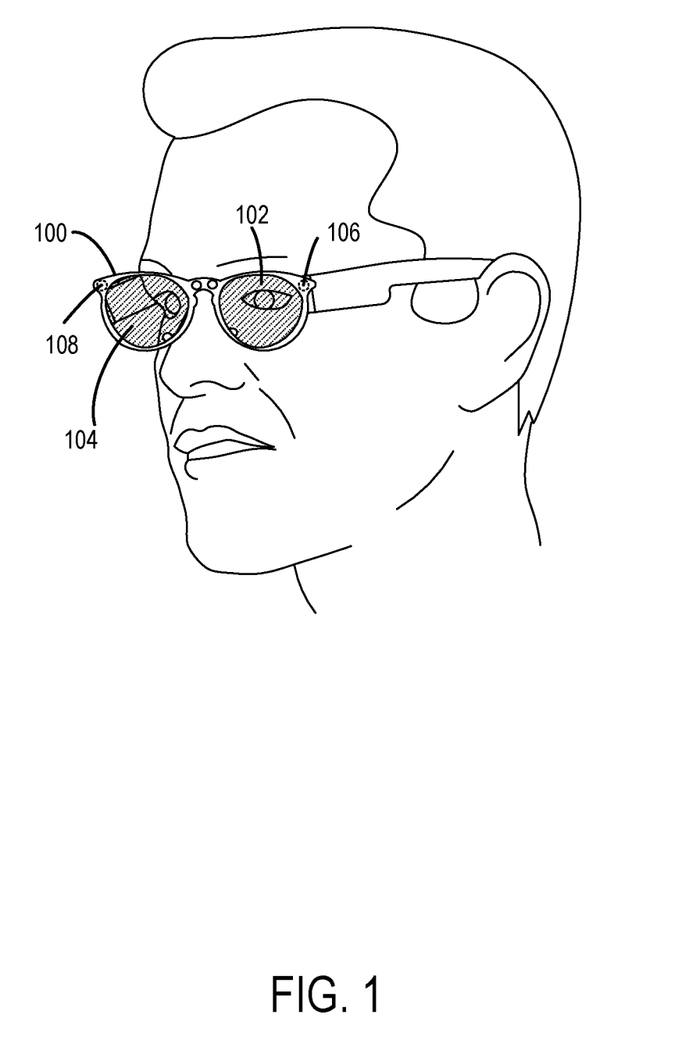
FIG. 1 shows an example head mounted display (HMD) device.

FIG. 1 shows an example HMD device 100. In the depicted example, the HMD device 100 comprises a left display 102 and a right display 104. In some implementations, the HMD device 100 may take the form of a virtual reality device that includes opaque, non-see-through near-eye displays. In other implementations, the HMD device 100 may take the form of an augmented reality device that comprises at least partially transparent near-eye displays that are configured to enable a user to view physical, real-world objects in a physical space through one or more partially transparent pixels displaying virtual object representations. The HMD device 100 also comprises a left projector 106 configured to project images for viewing using the left display 102. Here, the left projector 106 includes one or more lasers, a fast scan mirror system, and a slow scan mirror system. The fast scan mirror system and the slow scan mirror system are controllable to raster scan light from the one or more lasers to generate viewable images. An example slow scan mirror system is discussed with reference to FIGS. 2A and 2B. Similarly, a right projector 108 similarly has one or more lasers, and fast and slow scan mirror systems. In other examples, the HMD device 100 may have another configuration and/or include additional components not depicted.

Figure 2A:
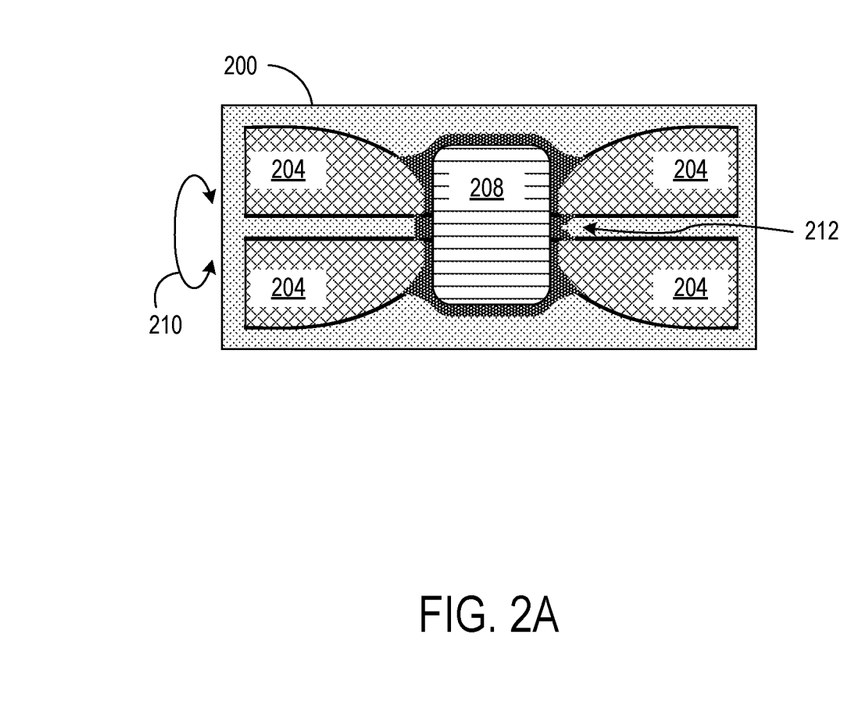
FIG. 2A shows a schematic view of an example slow scan mirror system for a scanning display device.
Figure 2B:
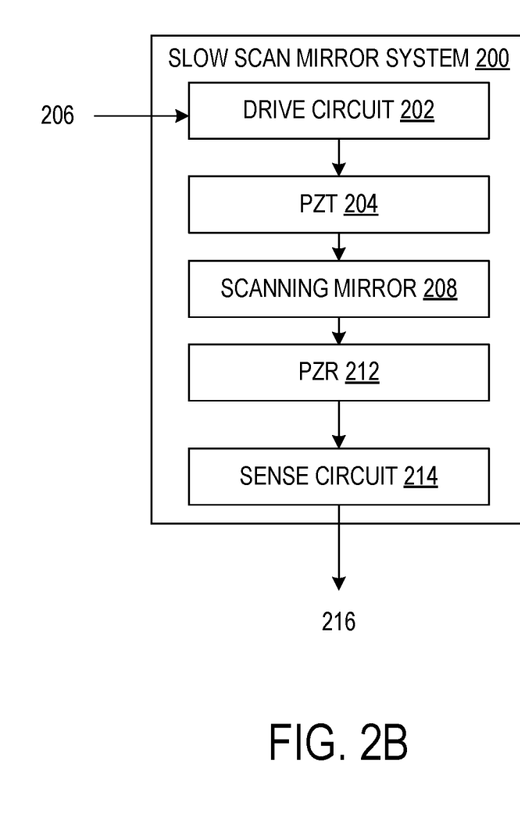
FIG. 2B shows a functional block diagram of the example slow scan mirror system of FIG. 2A.

FIG. 2A schematically illustrates an example slow scan mirror system 200. FIG. 2B depicts a functional block diagram for the slow scan mirror system 200. The slow scan mirror system 200 can be used as the slow scan mirrors for the left projector 106 and the right projector 108 of the HMD device 100, for example. The slow scan mirror system 200 includes a drive circuit 202 configured to drive a piezoelectric actuator (PZT) 204 based at least upon a drive signal 206. The PZT 204 also is coupled to a scanning mirror 208 such that movement in the PZT 204 is transferred to the scanning mirror 208. Here, the scanning mirror 208 can be a MEMS mirror or another suitable scanning device. The scanning mirror 208 is configured to rotate around an axis, as indicated by 210. As such, movement of the scanning mirror 208 can be expressed in changes to a scan angle over time, referred to as a trajectory.

The slow scan mirror system 200 further includes a piezoresistive material (PZR) 212 coupled to the scanning mirror 208. Such a configuration enables the PZR 212 to deform responsive to the scan angle of the scanning mirror 208. Resistance of the PZR 212 changes in relation to the deformation experienced by the PZR 212. The PZR 212 is further coupled to a sense circuit 214 configured to detect a change in the resistance of the PZR 212. The sense circuit 214 is further configured to provide an output 216 based at least upon the detected change in the resistance of the PZR 212.

As discussed in more detail below, a feedback loop (not depicted in FIG. 2B) is coupled to the output 216 to provide a feedback signal that can be used as, or used to derive (e.g., by computation and/or by signal processing), a control parameter for controlling the mirror trajectory in the slow scan direction. The control parameter can be used to adjust the drive signal 206 to form an adjusted drive signal if the sensed mirror trajectory deviates from the target mirror trajectory.

However, photons from an illumination source at some scan angles can impinge the PZR 212 and result in noise being injected into the sense circuit 214, thereby causing noise in the control parameter. Thus, such noise may be incorrectly detected as a change in trajectory of the scanning mirror 208. This can cause the feedback loop to erroneously adjust the drive signal 206, resulting in jitter in the real movement of the scanning mirror 208. FIGS. 2A and 2B are illustrative. In other examples, a slow scan mirror system may have another configuration. Further, other noise sources also can cause noise in a control parameter.

Figure 3:
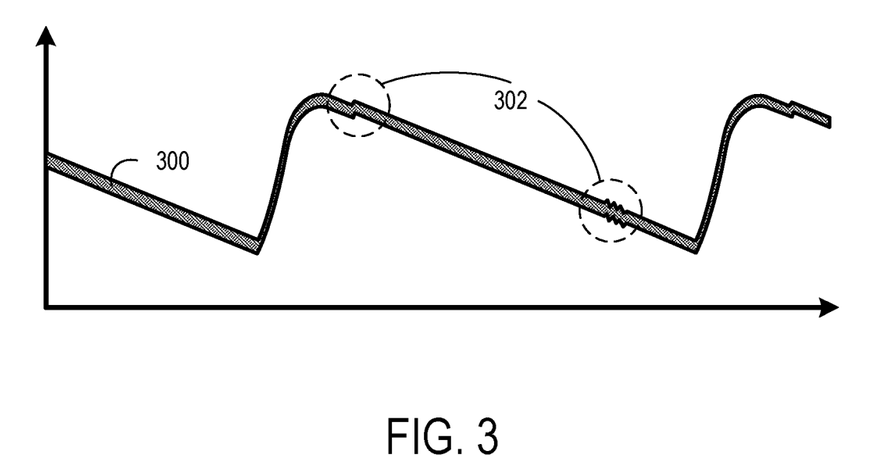
FIG. 3 schematically shows an example feedback signal from the slow scan mirror system in FIG. 2A that has noise distortions.

FIG. 3 schematically depicts an example feedback signal 300 with distortions 302 from such noise. As previously discussed, photons impinging on the PZR 212 may result in an erroneous response of the sense circuit 214. Further, such erroneous responses can result in an undesired adjustment of the drive signal 300. Such abrupt jumps in the drive signal 300 at the distortions 302 may result in a bright bar in displayed images. FIG. 3 is illustrative. In other examples, another noise source may result in distortions of a drive signal.

Figure 4:
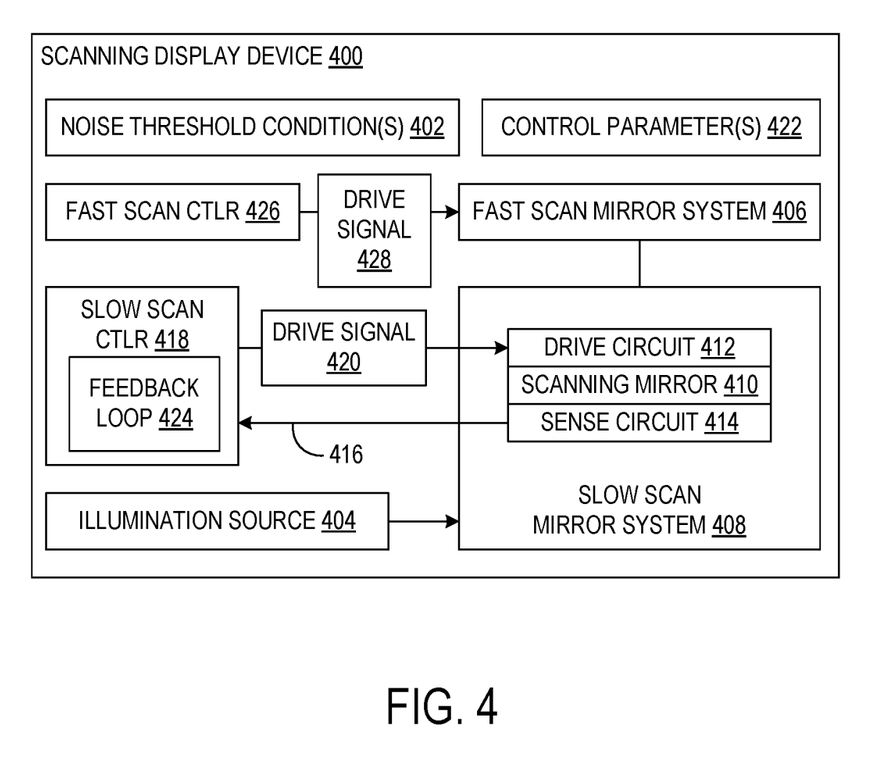
FIG. 4 shows a block diagram of an example scanning display device.

To address such distortions arising from noise distortion in a drive signal, a controller for a slow scan mirror system can be configured to apply a noise threshold condition to a control parameter prior to using the control parameter to adjust a mirror trajectory in a slow scan direction. The threshold condition is selected to help avoid mirror trajectory adjustment in response to noise in the control parameter. FIG. 4 shows a block diagram of an example scanning display device 400 that utilizes one or more of such noise threshold conditions 402. The HMD device 100 is an example of the scanning display device 400. Here, the scanning display device 400 comprises an illumination source 404 optically coupled to a fast scan mirror system 406 and a slow scan mirror system 408. The illumination source 404 can include one or more lasers or other suitable light sources.

The slow scan mirror system 408 includes a scanning mirror 410 coupled to a drive circuit 412 and a sense circuit 414. The slow scan mirror system 200 is an example implementation of the slow scan mirror system 408. The scanning display device 400 also comprises a slow scan controller 418 coupled to an input of the drive circuit 412 and an output 416 of the sense circuit 414. The slow scan controller 418 is configured to provide a drive signal 420 to control a trajectory of the scanning mirror 410.

The slow scan controller 418 utilizes a feedback loop 424 to obtain one or more control parameters 422 based at least upon the output 416 of the sense circuit 414. Here, the feedback loop 424 is configured to compare the selected control parameter(s) 422 to the selected noise threshold condition(s) 402. The slow scan controller 418 is configured to adjust the drive signal 420 to form an adjusted drive signal when the selected control parameter(s) 422 meets the selected noise threshold condition(s) 402. The adjusted drive signal is configured to change a trajectory of the scanning mirror 410. The slow scan controller 418 is also configured to continue operating the scanning mirror 410 according to the drive signal 420 when the control parameter 422 does not meet the noise threshold condition 402. In such a manner, the slow scan controller 418 can operate the scanning mirror 410 with a desired trajectory that has less distortions from noise than a slow scan controller that does not utilize the noise threshold conditions 402.

The depicted slow scan controller 418 can be implemented by electrical circuits, instructions on a storage device that are executable by a processing device, or any suitable combination thereof. In various examples, the slow scan controller 418 can further be configured to perform any operation disclosed herein. Similarly, the scanning display device 400 also comprises a fast scan controller 426 coupled to the fast scan mirror system 406. Here, the fast scan controller 426 is configured to provide a drive signal 428 to control a trajectory of the fast scan mirror system 406 in resonance. Details of the fast scan controller 426 and the fast scan mirror system 406 are omitted for clarity.

Figure 5:
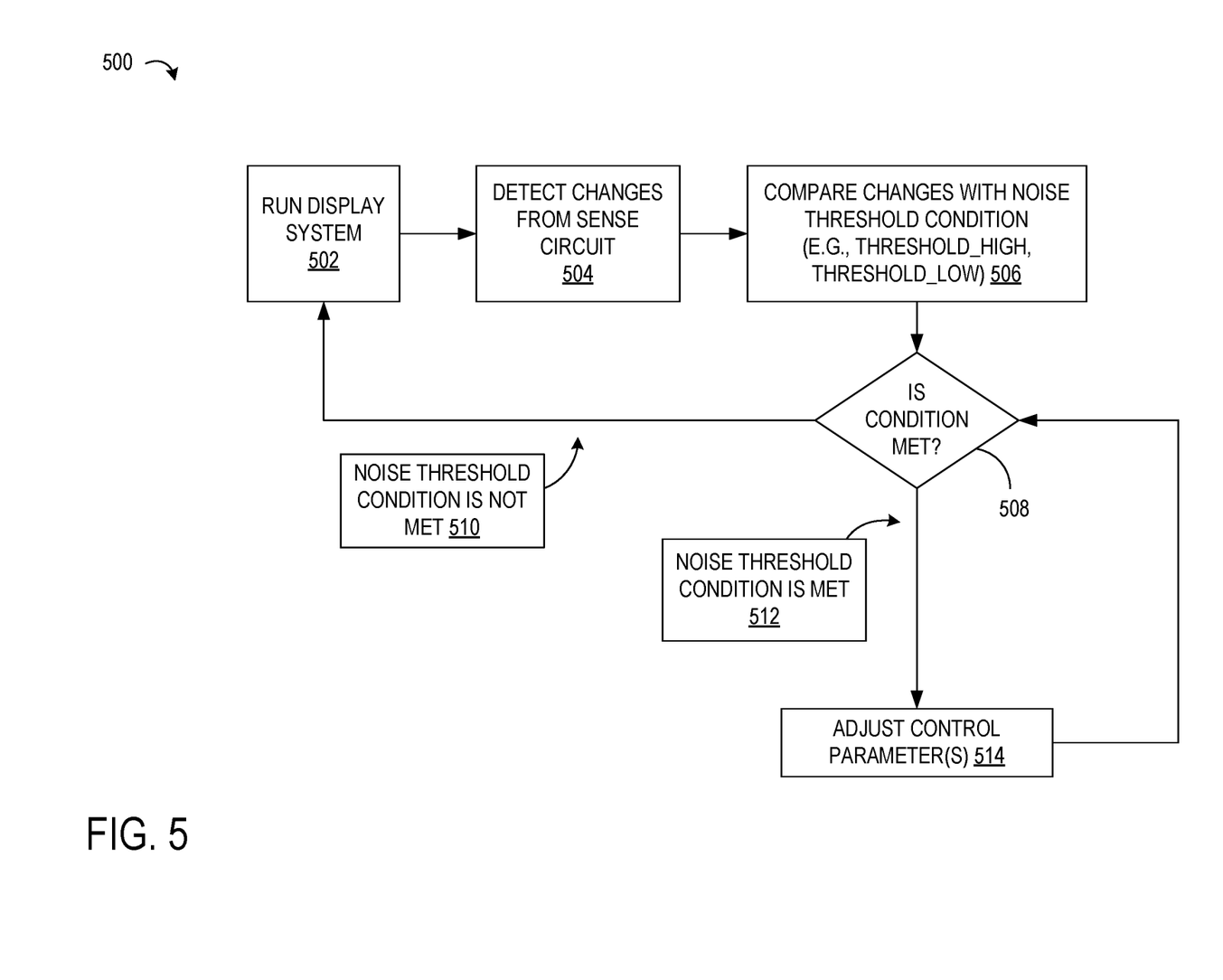
FIG. 5 shows a flow diagram illustrating an example algorithm for operating a slow scan mirror system utilizing a noise threshold condition.

FIG. 5 shows a flow diagram illustrating an example algorithm 500 for operating a scanning mirror utilizing a noise threshold condition. The algorithm 500 may be performed on the HMD device 100 and the scanning display device 400, as examples. In various examples, the algorithm 500 can be implemented in hardware, software, or suitable combinations thereof. At 502, the algorithm 500 runs a scanning display system including a slow scan mirror system, such as the slow scan mirror system 200 or the slow scan mirror system 408. The algorithm 500 detects changes in a response of a sense circuit of the slow scan mirror system to the display system operation, as indicated at 504. In some examples, the response of the sense circuit can be based at least upon a resistance of a PZR as discussed with reference to FIGS. 2A and 2B.

The algorithm 500 further compares the changes in the responses from the sense circuit with a threshold_high and/or a threshold_low (e.g., a noise threshold condition having a contiguous range of threshold values defined by one or more thresholds) as indicated at 506. Here, the threshold_high indicates a higher noise threshold value away from a trendline of the slow scan mirror system. Additionally, the threshold_low indicates a lower noise threshold value away from the trendline. In other examples, the threshold_high and the threshold_low can have a similar magnitude with one above the trendline and the other below the trendline. An example algorithm for determining the noise threshold condition is discussed with reference to FIG. 7. Continuing, the algorithm 500 determines whether the changes meet the noise threshold condition, as indicated at 508. When the noise threshold condition is not met, as indicated by 510, the algorithm 500 returns to running the scanning display system at 502. This helps enable the operation of the slow scan mirror system to follow a desired trajectory.

Alternatively, when the noise threshold condition is met, as indicated by 512, the algorithm 500 moves to 514, adjusting the one or more control parameters. Here, the response from the sense circuit is more likely to correspond to real movement of the scanning mirror than to noise. Such real movement may result in changes in ambient temperature, changes over time in the slow scan mirror system, and/or changes in electrical power consumption of the slow scan mirror system. As depicted, the algorithm 500 returns to 508, determining whether the noise threshold condition is met after adjusting the control parameters. In such a manner, the algorithm 500 can help enable operation of the slow scan mirror system without noise distortions. Additionally, the algorithm 500 can also help to reduce jitter in the trajectory of the scanning mirror compared to an algorithm that omits the use of such threshold noise conditions. FIG. 5 is illustrative. In further examples, the algorithm 500 may have another configuration.

Figure 6:
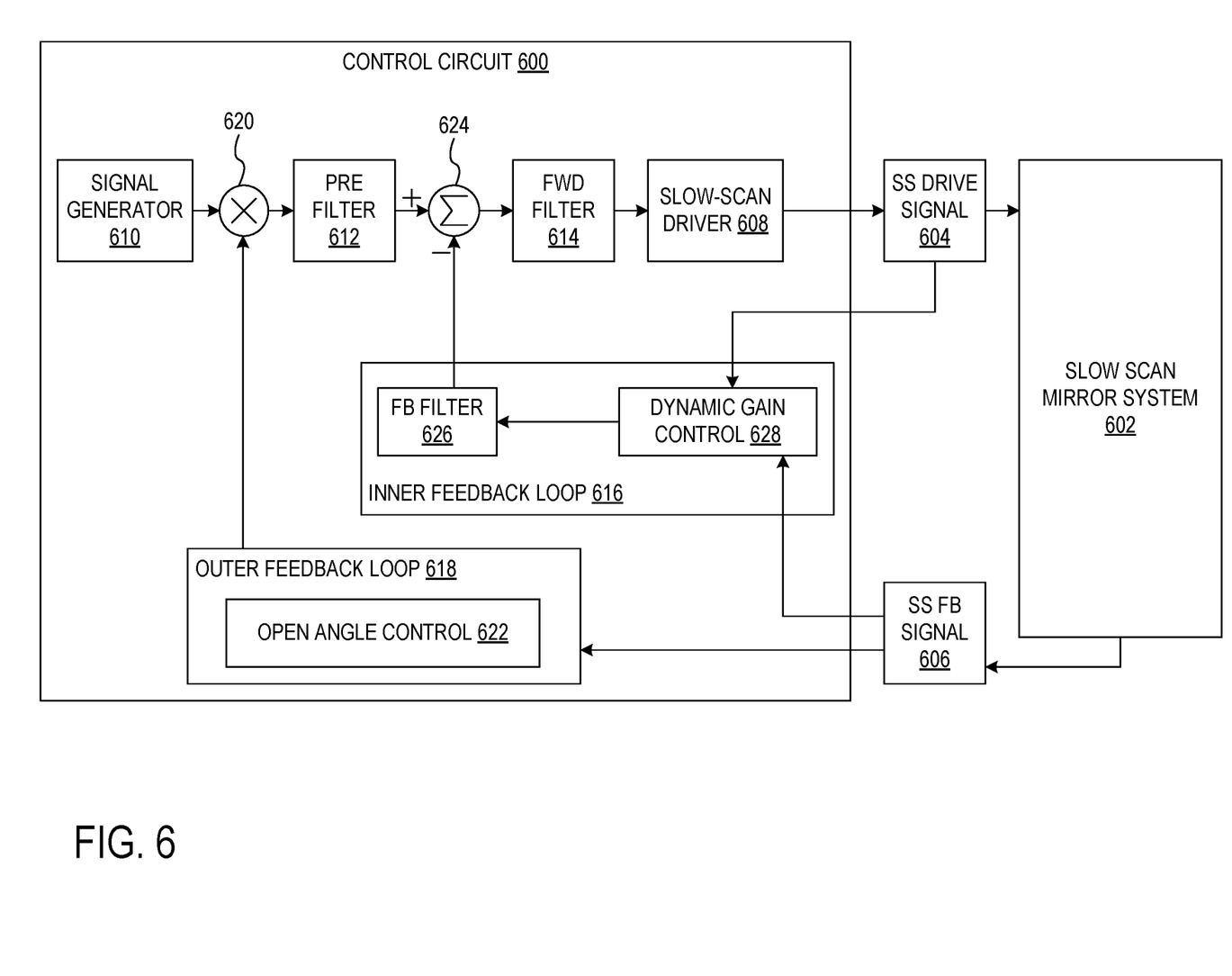
FIG. 6 shows a block diagram of an example control circuit.

As previously mentioned, in some examples, a controller for a scanning mirror system can be implemented as hardware electronic circuits. FIG. 6 schematically depicts an example control circuit 600 coupled to a slow scan mirror system 602. The control circuit 600 is an example implementation of the slow scan controller 418. Similar, to the slow scan controller 418, the control circuit 600 is configured to provide a slow scan drive signal (SS drive signal) 604 and to receive a slow scan feedback signal (SS FB signal) 606 from the slow scan mirror system 602. More specifically, the control circuit 600 is configured to generate the SS drive signal 604 using a slow scan driver 608. Further, a signal generator 610 is configured to provide a waveform that forms an overall shape of the SS drive signal 604. The waveform can include a triangle shape, a linear ramp, a sawtooth, or another suitable shape, for example. Additionally, a pre-filter 612 and a forward (FWD) filter 614 are configured to shape and gain scale the waveform from the signal generator 610. Additionally, an inner feedback loop 616 and an outer feedback loop 618 are configured to adjust the waveform based at least in part on the SS FB signal 606.

Control circuit 600 further comprises a multiplier 620 configured to combine the waveform from the signal generator 610 and an output of an open angle control (OAC) module 622 configured to be responsive to the SS FB signal 606. As a specific example, the OAC module 622 can determine a first control parameter based at least in part upon the SS FB signal 606. The control circuit 600 further includes a summer module 624 configured to combine an output of the pre-filter 612 with an output of a feedback (FB) filter 626 of the inner feedback loop 616. The inner feedback loop 616 also includes a dynamic gain control module 628 configured to compare the SS drive signal 604 to the SS FB signal 606. Further, the dynamic gain control module 628 is configured to provide an output (e.g., a second control parameter) responsive to the comparison, and also based at least upon a target gain. Such a configuration can help to compensate (through the inner feedback loop 616) for mismatches in overall waveform shape between the SS drive signal 604 and the SS FB signal 606. FIG. 6 is illustrative. In other examples, the control circuit 600 may have another configuration. In yet further examples, one or more depicted components of the control circuit 600 can be implemented as functional blocks having executable instructions, such as software and/or firmware, for example.

Figure 7:
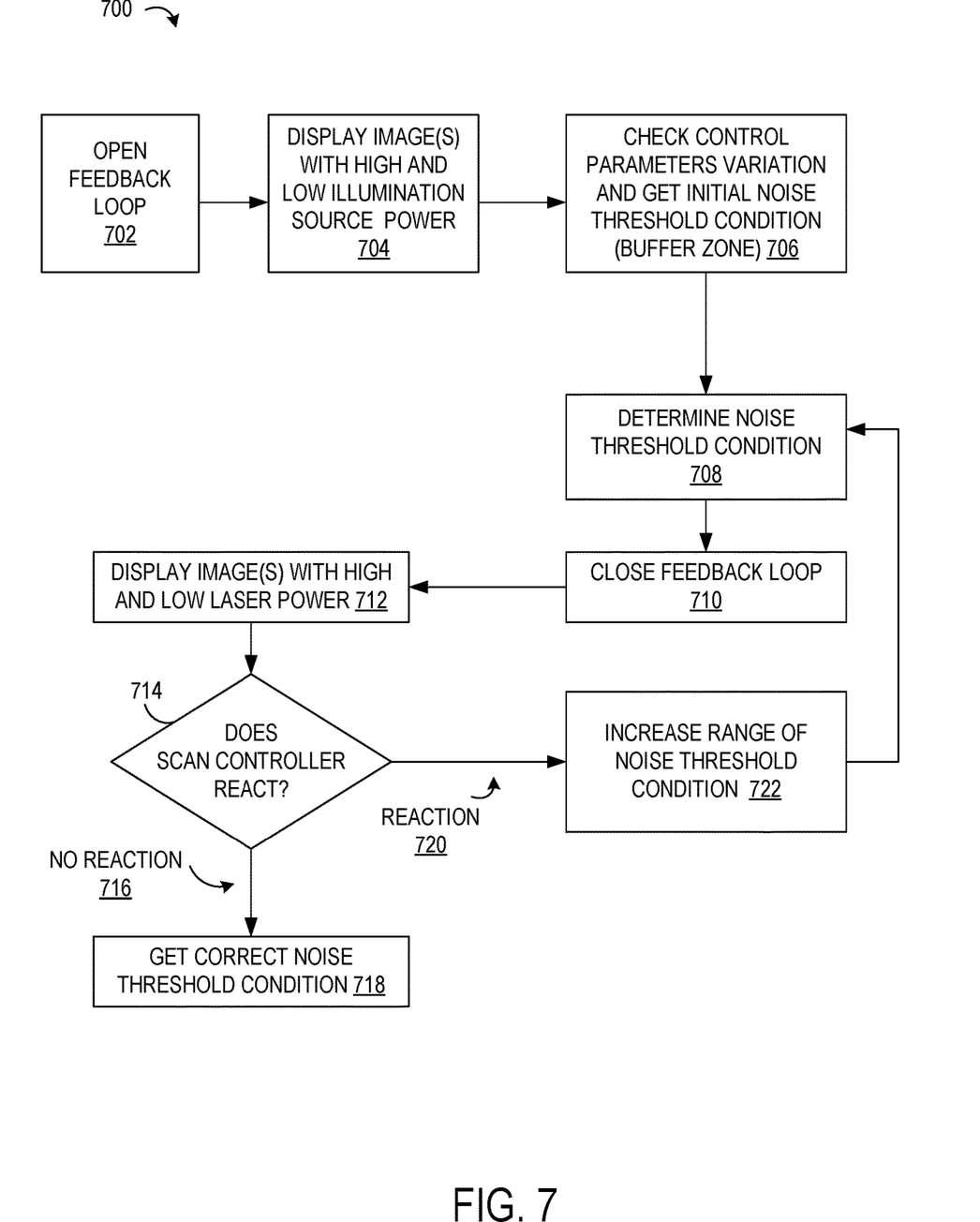
FIG. 7 shows a flow diagram illustrating an example algorithm for determining a noise threshold condition.

The above examples relate to utilizing a noise threshold condition for operating a scanning mirror system. The noise threshold condition can be determined while injecting noise, such as noise levels similar to noise levels experienced during real applications and/or uses cases of the scanning mirror system, for example. FIG. 7 illustrates a flowchart illustrating an example algorithm 700 for determining a noise threshold condition. The algorithm 700 can be performed by a scan controller coupled to a scanning mirror system and on a scanning display device, such as on the HMD device 100 or the scanning display device 400, for example. In the depicted example, a noise threshold condition is determined to address noise distortions resulting from photons in laser light, such as the distortions 302, for example. It will be understood that an analogous algorithm may be used to address noise distortions from other sources, such as electrical noise (e.g., from nearby circuitry) or mechanical noise (e.g., vibration injected into the scanning mirror system), for example.

At 702, the algorithm 700 opens a feedback loop associated with the control parameter. Further, the algorithm 700 displays one or more images with a high illumination source power and a low (non-zero) illumination source power as indicated at 704. For example, the laser powers are selected to reflect a range of expected injected noise during operation of the scanning mirror. The algorithm 700 checks for variation in the control parameter resulting from the high laser power and the low laser power and gets an initial noise threshold condition based at least upon the variation, as indicated at 706. As a specific example, the variation can be determined by measuring responses of a sense circuit coupled to the scanning mirror as a function of illumination source power. Additionally, the algorithm 700 sets up an initial noise threshold condition based upon the initial noise threshold condition as indicated at 708.

Continuing, the algorithm 700 closes the feedback loop, as indicated at 710. Further, at 712, the algorithm 700 displays image(s) with the high laser power and the low laser power. Here, the algorithm 700 moves to 714, determining whether the scan controller reacted (e.g., whether a drive signal was adjusted to form an adjusted drive signal) while displaying the high laser power and/or the low laser power. When the scan controller does not react, indicated by 716, the algorithm 700 moves to 718, getting a correct noise threshold condition. Alternatively, when the scan controller reacts, indicated by 720, the algorithm 700 moves to 722, increasing a range of the noise threshold condition, and returns to 708. In such a manner, the algorithm 700 updates the noise threshold condition. In some examples, the algorithm 700 may loop through one or more of 708, 710, 712, 714, or 722 to determine a noise threshold condition where the scan controller does not react when displaying the high laser power and/or the low laser power. In some examples, the algorithm 700 may be repeated for another feedback loop. FIG. 7 is illustrative. In other examples, the algorithm 700 may have another configuration.

Figure 8A:
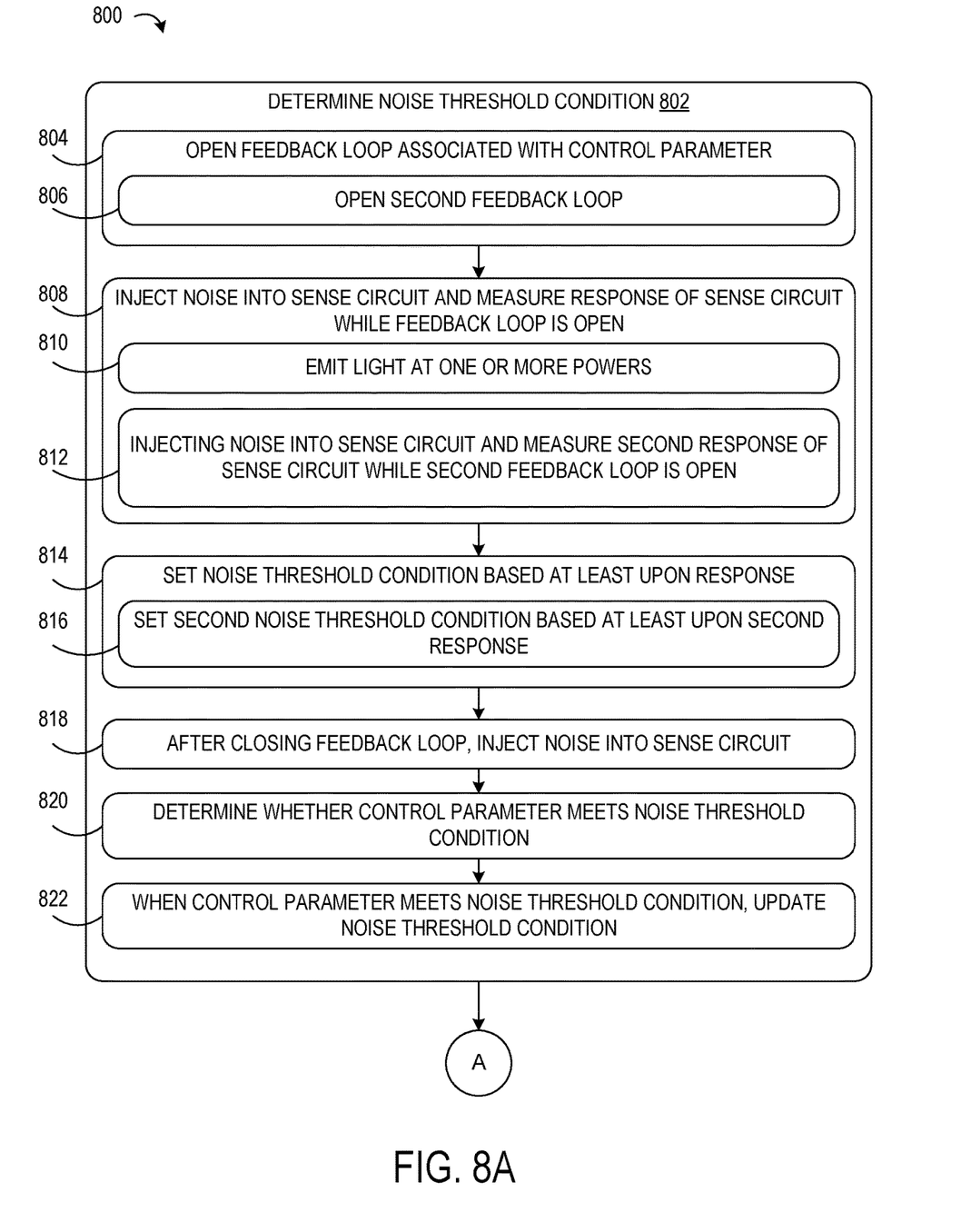
FIGS. 8A and 8B show a flow diagram illustrating an example method for utilizing a noise threshold condition to operate a slow scan mirror system.
Figure 8B:
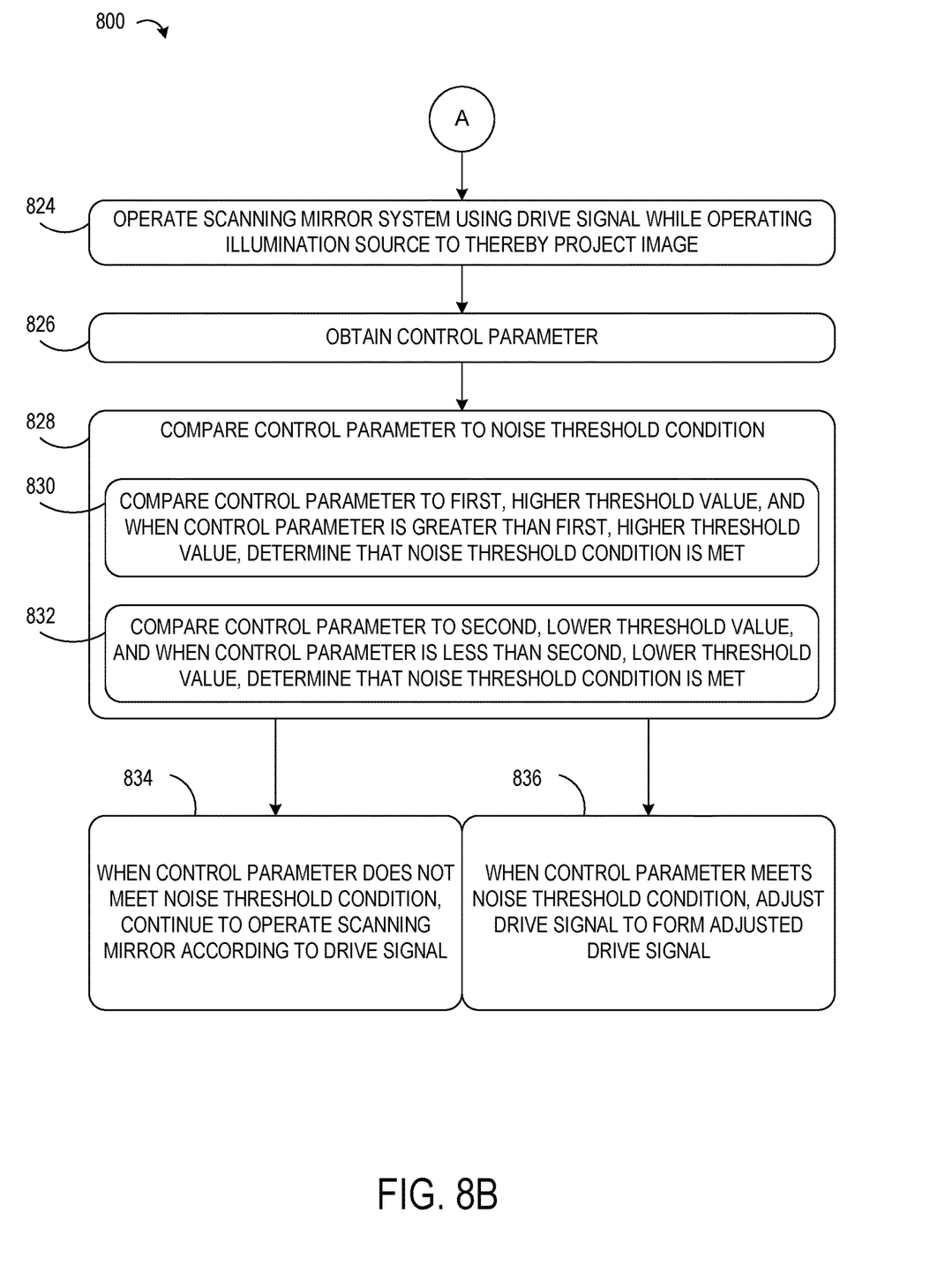

FIGS. 8A and 8B illustrate an example method 800 for utilizing noise threshold conditions with control parameters when operating a scanning mirror. The method 800 is performed by a scanning display device comprising an illumination source, and a scanning mirror system including a sense circuit coupled to the scanning mirror, such as the HMD device 100 or the scanning display device 400. The method 800 optionally comprises determining a noise threshold condition at 802. Determining the noise threshold condition comprises opening a feedback loop associated with a control parameter, as indicated at 804. In some examples, the scanning display device may further utilize a second feedback loop associated with the control parameter. In such examples, the method 800 further includes, at 806, opening the second feedback loop.

Determining the noise threshold condition further comprises, at 808, injecting noise into the sense circuit and measuring a response of the sense circuit while the feedback loop is open. In some examples, photons from the illumination source (e.g. lasers) may inject noise as previously discussed. In such examples, injecting the noise into the sense circuit comprises emitting light at one or more powers, as indicated at 810. In examples having the second noise threshold condition, determining the noise threshold condition also comprises, at 812, injecting noise into the sense circuit and measuring a second response of the sense circuit while the second feedback loop is open. Additionally, determining the noise threshold condition comprises, at 814, setting the noise threshold condition based at least upon the response. In examples having the second noise threshold condition, determining the noise threshold condition also comprises, at 816, setting the second noise threshold condition based at least upon the second response.

Determining the noise threshold condition also comprises, at 818, after closing the feedback loop, injecting the noise into the sense circuit, and, at 820, determining whether the control parameter meets the noise threshold condition. Further, determining the noise threshold condition comprises, when the control parameter meets the noise threshold condition, updating the noise threshold condition as indicated at 822. This can help the scanning display device to address noise distortions. In other examples, one or more depicted components of 802 may be omitted.

Continuing, the method 800 comprises, at 824, operating the scanning mirror system using a drive signal while operating the illumination source to thereby project an image. The method 800 also comprises, at 826, obtaining the control parameter based at least upon an output of the sense circuit. At 828, the method 800 comprises comparing the control parameter to the noise threshold condition. In some examples, the noise threshold condition includes a first, higher threshold value and a second, lower threshold value. In such examples, comparing the control parameter to the noise threshold condition comprises comparing the control parameter to the first, higher threshold value, and when the control parameter is greater than the first, higher threshold value, determining that the noise threshold condition is met, as indicated at 830. Alternatively or additionally, comparing the control parameter to the noise threshold condition comprises comparing the control parameter to the second, lower threshold value, and when the control parameter is less than the second, lower threshold value, determining that the noise threshold condition is met, as indicated at 832. In such a manner, different magnitudes of noise threshold values away from a position trendline of the scanning mirror system can be used. In other examples, the threshold values can have a same magnitude with one above the position trendline and the other below the position trendline. In yet further examples, a single threshold value can be used compared to a trendline. In some such examples, an absolute value of the control parameter can be compared to the threshold value.

The method 800 further comprises, when the control parameter does not meet the noise threshold condition, continue operating the scanning mirror according to the drive signal, as indicated at 834. Further, the method 800 comprises, when the control parameter meets the noise threshold condition, adjusting the drive signal to form an adjusted drive signal to change a trajectory of the scanning mirror, as indicated at 836. In such a manner, the method 800 can ignore disruptions in the drive signal arising from noise while adjusting the drive signal with real movement of the scanning mirror.

In some examples, the methods and processes described herein may be tied to a computing system of one or more computing devices. In particular, such methods and processes may be implemented as a computer-application program or service, an application-programming interface (API), a library, and/or other computer-program product.

Figure 9:
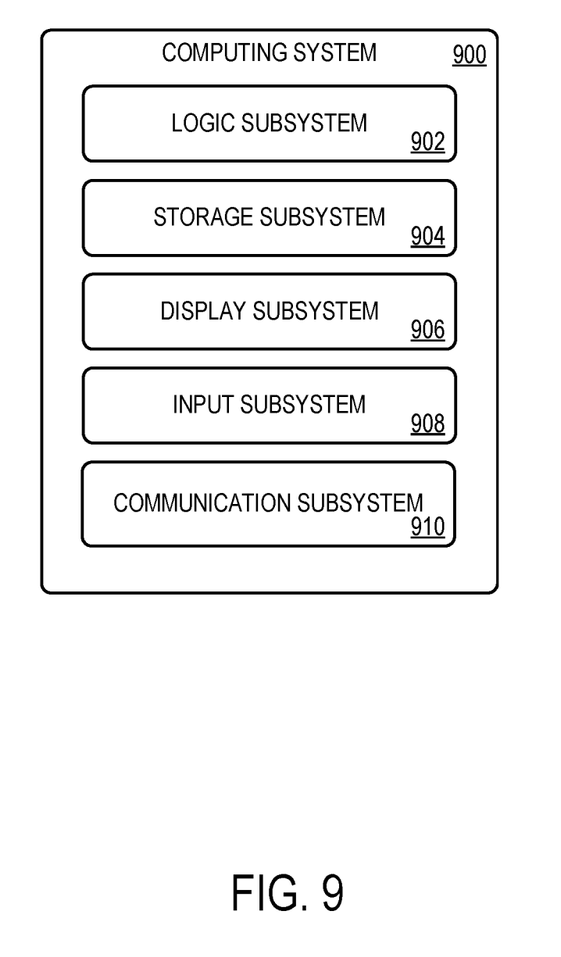
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. The HMD device 100 and the scanning display device 400 are examples of computing system 900.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic subsystem 902 executing instructions held by storage subsystem 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

One example provides a method enacted on a scanning display device comprising an illumination source, and a scanning mirror system including a sense circuit coupled to a scanning mirror. The method comprises operating the scanning mirror system using a drive signal while operating the illumination source to thereby project an image, obtaining a control parameter based at least upon an output of the sense circuit, comparing the control parameter to a noise threshold condition, when the control parameter does not meet the noise threshold condition, continue operating the scanning mirror according to the drive signal, and when the control parameter meets the noise threshold condition, adjusting the drive signal to form an adjusted drive signal to change a trajectory of the scanning mirror. In some such examples, the noise threshold condition additionally or alternatively includes a first, higher threshold value and a second, lower threshold value. In some such examples, comparing the control parameter to the noise threshold condition additionally or alternatively comprises comparing the control parameter to the first, higher threshold value, and when the control parameter is greater than the first, higher threshold value, determining that the noise threshold condition is met. In some such examples, comparing the control parameter to the noise threshold condition additionally or alternatively comprises comparing the control parameter to the second, lower threshold value, and when the control parameter is less than the second, lower threshold value, determining that the noise threshold condition is met. In some such examples, the method additionally or alternatively comprises determining the noise threshold condition by opening a feedback loop associated with the control parameter, injecting noise into the sense circuit and measuring a response of the sense circuit while the feedback loop is open, and setting the noise threshold condition based at least upon the response. In some such examples, injecting the noise into the sense circuit additionally or alternatively comprises emitting light at one or more powers. In some such examples, determining the noise threshold condition additionally or alternatively comprises after closing the feedback loop, injecting the noise into the sense circuit, determining whether the control parameter meets the noise threshold condition, and when the control parameter meets the noise threshold condition, updating the noise threshold condition. In some such examples, the feedback loop additionally or alternatively is a first feedback loop, the noise threshold condition additionally or alternatively is a first noise threshold condition, and the method additionally or alternatively comprises determining a second noise threshold condition by opening a second feedback loop, injecting noise into the sense circuit and measuring a second response of the sense circuit while the second feedback loop is open, and setting the second noise threshold condition based at least upon the second response.

Another example provides a scanning display device comprising an illumination source, a scanning mirror system configured to scan light from the illumination source, wherein the scanning mirror system includes a scanning mirror, a drive circuit operatively coupled to the scanning mirror, and a sense circuit operatively coupled to the scanning mirror, and a control circuit configured to obtain a control parameter based at least upon an output of the sense circuit, and adjust operation of the scanning mirror based at least upon the control parameter and a noise threshold condition for the control parameter. In some such examples, the mirror system additionally or alternatively comprises a piezo-resistive material coupled to the scanning mirror and the sense circuit. In some such examples, the control circuit additionally or alternatively is configured to compare the control parameter to one or more of a first, higher threshold value or a second, lower threshold value. In some such examples, the control circuit additionally or alternatively is configured to adjust a drive signal for driving the scanning mirror system when the control parameter meets the noise threshold condition.

Another example provides a scanning display device comprising an illumination source, a scanning mirror system including a scanning mirror, a drive circuit operatively coupled to the scanning mirror, and a sense circuit operatively coupled to the scanning mirror, a logic subsystem, and a memory subsystem comprising instructions executable by the logic subsystem to operate the scanning mirror using a drive signal while operating the illumination source to thereby project an image, obtain a control parameter based at least upon an output of the sense circuit, compare the control parameter to a noise threshold condition, when the control parameter does not meet the noise threshold condition, continue to operate the scanning mirror according to the drive signal, and when the control parameter meets the noise threshold condition, adjust the drive signal to form an adjusted drive signal to change a trajectory of the scanning mirror. In some such examples, the noise threshold condition additionally or alternatively includes a first, higher threshold value and a second, lower threshold value. In some such examples, the instructions executable to compare the control parameter to the noise threshold condition additionally or alternatively comprise instructions executable to compare the control parameter to the first, higher threshold value, and when the control parameter is greater than the first, higher threshold value, determine that the noise threshold condition is met. In some such examples, the instructions executable to compare the control parameter to the noise threshold condition additionally or alternatively comprise instructions executable to compare the control parameter to the second, lower threshold value, and when the control parameter is less than the second, lower threshold value, determine that the noise threshold condition is met. In some such examples, the instructions are additionally or alternatively executable to determine the noise threshold condition by open a feedback loop associated with the control parameter, inject noise into the sense circuit and measure a response of the sense circuit while the feedback loop is open, and set the noise threshold condition based at least upon the response. In some such examples, the instructions executable to inject the noise into the sense circuit additionally or alternatively comprise instructions executable to emit light at one or more powers. In some such examples, the instructions to determine the noise threshold condition additionally or alternatively comprise instructions executable to after closing the feedback loop, inject the noise into the sense circuit, determine whether the noise threshold condition was met, and when the noise threshold condition was met, update the noise threshold condition. In some such examples, the control parameter additionally or alternatively is a first control parameter, the noise threshold condition additionally or alternatively is a first noise threshold condition, the response additionally or alternatively is a first response, and the instructions are additionally or alternatively executable to determine a second noise threshold condition by opening a second feedback loop, injecting noise into the sense circuit and measuring a second response of the sense circuit while the second feedback loop is open, and setting the second noise threshold condition based at least upon the second response.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a scanning display device comprising an illumination source, and a scanning mirror system including a sense circuit coupled to a scanning mirror, a method comprising:
    operating the scanning mirror system using a drive signal to control a trajectory of the scanning mirror system while operating the illumination source to thereby project an image, the trajectory comprising changes to a scan angle of the scanning mirror system over time;
    obtaining a control parameter based at least upon an output of the sense circuit;
    comparing the control parameter to a noise threshold condition;
    when the control parameter does not meet the noise threshold condition, continue operating the scanning mirror according to the drive signal; and
    when the control parameter meets the noise threshold condition, adjusting the drive signal to form an adjusted drive signal to change the trajectory of the scanning mirror and operating the scanning mirror system using the adjusted drive signal.

2. The method of claim 1, wherein the noise threshold condition includes a first, higher threshold value and a second, lower threshold value.

3. The method of claim 2, wherein comparing the control parameter to the noise threshold condition comprises comparing the control parameter to the first, higher threshold value, and when the control parameter is greater than the first, higher threshold value, determining that the noise threshold condition is met.

4. The method of claim 2, wherein comparing the control parameter to the noise threshold condition comprises comparing the control parameter to the second, lower threshold value, and when the control parameter is less than the second, lower threshold value, determining that the noise threshold condition is met.

5. The method of claim 1, further comprising determining the noise threshold condition by
opening a feedback loop associated with the control parameter,
injecting noise into the sense circuit and measuring a response of the sense circuit while the feedback loop is open, and
setting the noise threshold condition based at least upon the response.

6. The method of claim 5, wherein injecting the noise into the sense circuit comprises emitting light at one or more powers.

7. The method of claim 5, wherein determining the noise threshold condition further comprises
after closing the feedback loop, injecting the noise into the sense circuit,
determining whether the control parameter meets the noise threshold condition, and
when the control parameter meets the noise threshold condition, updating the noise threshold condition.

8. The method of claim 5, wherein the feedback loop is a first feedback loop, wherein the noise threshold condition is a first noise threshold condition, and wherein the method further comprises determining a second noise threshold condition by
opening a second feedback loop,
injecting noise into the sense circuit and measuring a second response of the sense circuit while the second feedback loop is open, and
setting the second noise threshold condition based at least upon the second response.

9. A scanning display device comprising:
an illumination source;
a scanning mirror system configured to scan light from the illumination source, wherein the scanning mirror system includes
a scanning mirror,
a drive circuit operatively coupled to the scanning mirror, and
a sense circuit operatively coupled to the scanning mirror; and
a control circuit configured to obtain a control parameter based at least upon an output of the sense circuit, when the control parameter does not meet a noise threshold condition, operate the scanning mirror using a drive signal to control a trajectory of the scanning mirror, and when the control parameter meets the noise threshold condition, operate the scanning mirror using an adjusted drive signal to change the trajectory of the scanning mirror, the trajectory comprising changes to a scan angle of the scanning mirror over time.

10. The scanning display device of claim 9, wherein the mirror system comprises a piezo-resistive material coupled to the scanning mirror and the sense circuit.

11. The scanning display device of claim 9, wherein the control circuit is configured to compare the control parameter to one or more of a first, higher threshold value or a second, lower threshold value.

12. The scanning display device of claim 9, wherein the control circuit is configured to adjust the drive signal to form the adjusted drive signal when the control parameter meets the noise threshold condition.

13. A scanning display device comprising:
an illumination source;
a scanning mirror system including
a scanning mirror,
a drive circuit operatively coupled to the scanning mirror, and
a sense circuit operatively coupled to the scanning mirror;
a logic subsystem; and
a memory subsystem comprising instructions executable by the logic subsystem to
operate the scanning mirror using a drive signal to control a trajectory of the scanning mirror while operating the illumination source to thereby project an image, the trajectory comprising changes to a scan angle of the scanning mirror over time,
obtain a control parameter based at least upon an output of the sense circuit;
compare the control parameter to a noise threshold condition;
when the control parameter does not meet the noise threshold condition, continue to operate the scanning mirror according to the drive signal; and
when the control parameter meets the noise threshold condition, adjust the drive signal to form an adjusted drive signal to change the trajectory of the scanning mirror, and operate the scanning mirror using the adjusted drive signal.

14. The scanning display device of claim 13, wherein the noise threshold condition includes a first, higher threshold value and a second, lower threshold value.

15. The scanning display device of claim 14, wherein the instructions executable to compare the control parameter to the noise threshold condition comprise instructions executable to compare the control parameter to the first, higher threshold value, and when the control parameter is greater than the first, higher threshold value, determine that the noise threshold condition is met.

16. The scanning display device of claim 14, wherein the instructions executable to compare the control parameter to the noise threshold condition comprise instructions executable to compare the control parameter to the second, lower threshold value, and when the control parameter is less than the second, lower threshold value, determine that the noise threshold condition is met.

17. The scanning display device of claim 13, wherein the instructions are further executable to determine the noise threshold condition by
open a feedback loop associated with the control parameter,
inject noise into the sense circuit and measure a response of the sense circuit while the feedback loop is open, and
set the noise threshold condition based at least upon the response.

18. The scanning display device of claim 17, wherein the instructions executable to inject the noise into the sense circuit comprise instructions executable to emit light at one or more powers.

19. The scanning display device of claim 17, wherein the instructions to determine the noise threshold condition further comprise instructions executable to after closing the feedback loop, inject the noise into the sense circuit, determine whether the noise threshold condition was met, and when the noise threshold condition was met, update the noise threshold condition.

20. The scanning display device of claim 17, wherein the control parameter is a first control parameter, the noise threshold condition is a first noise threshold condition, the response is a first response, and the instructions are further executable to determine a second noise threshold condition by opening a second feedback loop, injecting noise into the sense circuit and measuring a second response of the sense circuit while the second feedback loop is open, and setting the second noise threshold condition based at least upon the second response.

* * * * *